United States Patent
Lundback

[19]

[11] Patent Number: 5,320,504
[45] Date of Patent: Jun. 14, 1994

[54] FLAP VALVE ARRANGEMENT
[75] Inventor: Stig Lundback, Vaxholm, Sweden
[73] Assignee: Humanteknik AB, Sweden
[21] Appl. No.: 960,434
[22] PCT Filed: Jun. 7, 1991
[86] PCT No.: PCT/SE91/00409
§ 371 Date: Dec. 7, 1992
§ 102(e) Date: Dec. 7, 1992
[87] PCT Pub. No.: WO91/19097
PCT Pub. Date: Dec. 12, 1991
[30] Foreign Application Priority Data
Jun. 7, 1990 [SE] Sweden .................. 9002045-4
[51] Int. Cl.⁵ .................. F16K 15/16; F04B 43/02
[52] U.S. Cl. .................. 417/479; 417/413 R; 137/512.15; 137/855
[58] Field of Search .......... 417/412, 413, 479, 480; 137/512.15, 855, 859

[56] References Cited
U.S. PATENT DOCUMENTS

| | | | |
|---|---|---|---|
| 3,298,320 | 1/1967 | Latmam | 417/479 |
| 3,507,586 | 4/1970 | Gronemeyer | 137/855 |
| 3,786,833 | 1/1974 | Frenkel | 137/512.15 |
| 3,987,938 | 10/1976 | Cooprider et al. | 417/479 |
| 4,217,921 | 8/1980 | Gidner | 137/512.15 |
| 4,750,868 | 6/1988 | Lundback | 417/412 |

FOREIGN PATENT DOCUMENTS
0374115  6/1990  European Pat. Off. .

Primary Examiner—Richard A. Bertsch
Assistant Examiner—Peter Koryinyk
Attorney, Agent, or Firm—Hill, Steadman & Simpson

[57] ABSTRACT

A flap valve arrangement for one-way control of the flow of fluid in between an upstream chamber and a downstream chamber, and particularly an inlet valve in a piston-type positive-displacement pump, having wall parts which define between them a fluid-flow passage which connects both of the chambers, and a valve flap which is mounted on a first wall part and which is movable across the passage under the influence of fluid forces acting on the flap, into and out of engagement with the second wall part to close and open the passage respectively. The second wall part is provided with openings which form part of the fluid passage and which are open on one side of the wall part directed towards the upstream chamber and on a side of the wall part directed towards the downstream chamber. A plurality of valve flaps supporting elements are disposed between the openings on the side of the second wall part which is directed toward the downstream chamber.

19 Claims, 1 Drawing Sheet

5,320,504 ent relates to a nonreturn flap valve arrangement, and particularly to a flap valve arrangement which can be used as an inlet valve in a piston-type positive-displacement pump.

FLAP VALVE ARRANGEMENT

BACKGROUND OF THE INVENTION

The present intention relates to a nonreturn flap valve arrangement, and particularly to a flap valve arrangement which can be used as an inlet valve in a piston-type positive-displacement pump.

European Patent Application No. 89850427.9 discloses piston-type positive-displacement pumps some embodiments of which include a flap valve which functions as a one-way or nonreturn valve between an inlet and a pump chamber which is alternately contracted and pressurised, by means of the displacement element of the pump (the pump piston), for discharging the fluid in the pump chamber through the pump outlet, and relieved from pressure for the purpose of refilling of the pump chamber with fluid through the inlet.

One edge or one end of the valve flap is mounted on one side of a flow passage which opens into the pump chamber, and the other end or opposite edge which is directed towards the pump chamber is movable across the passage into sealing engagement with the other side of the passage under the influence of the fluid forces acting on the flap.

The flap may be devoid of any intrinsic bias, i.e. may be constructed and arranged so as to have no pronounced tendency to adopt any specific position when no fluid-generated forces act thereon, although the flap may, alternatively, be prestressed to a given, relatively slight degree, such that it will tend to take a given, distinct position in the absence of fluid forces thereon and such that the flap will only move from this given position when acted upon by a force that overcomes the bias inherent in the flap.

During the pump-chamber filling phase, the flap is held in a valve-open position by the fluid flowing into the chamber. When the pressure on the outlet side of the valve, or the pump-chamber side, has essentially equalized in relation to the pressure on the inlet side, the flow of fluid into the chamber will cease, and upon commencement of the discharge phase, the pressure on the pump-chamber side will exceed the pressure on the inlet side. The fluid in the pump chamber will then tend to flow back into the flow passage and cause the flap to take a valve-closing position.

Depending on how the flap is constructed and arranged, a larger or a smaller volume of fluid is able to flow back into the flow passage before the flap has closed the passage completely. This backward flow of fluid is disadvantageous and should be limited to the greatest possible extent. At the same time, the flap should be able to open the flow passage quickly at the commencement of the filling phase, so as to expose a large cross-section area for the flow of the fluid into the pump chamber and so that the pump chamber can be filled rapidly with the minimum drop in pressure across the flow passage. The passage should also be as short as possible, for similar reasons, i.e. should have the smallest possible extent in the flow direction. Furthermore, the mass that needs to be accelerated during the filling phase should be as small as possible. This also applies to the mass which needs to be retarded when the inlet valve is closed.

The desirable large cross-section area of the flow passage can be provided by placing the walls defining the flow passage widely apart so that the passage will have the form of a wide gap. A wide gap requires a long flap, however, and also has to be rather long itself, because the flap has to be long enough to bridge the entire gap without having to move through a wide angle to open and close the passage.

A long flap is disadvantageous because in the closed or bridging position thereof a substantial portion of the flap is unsupported by the walls of the passage. During the phase of the pump operating cycle in which the fluid trapped in the pump chamber is discharged, the flap is subjected to high pressure from the fluid in the pump chamber, and when the flap is made of plastic film or plastic foil as is desirable in many cases, the flap will tend to bulge outwardly towards the inlet.

This outward bulging of the flap can be counteracted by reinforcing the flap in some appropriate fashion, although such reinforcement will complicate manufacture and may, to some extent, create undesirable resistance to the opening movement of the flap.

SUMMARY OF THE INVENTION

A primary object of the present invention is to provide a flap valve which can be moved to its closed position with the minimum of backflow but which, nevertheless, can open the flow passage quickly in a manner to present a large cross-section area without the valve flap bulging towards the inlet when subjected to the fluid discharge pressure in the pump chamber.

This object is achieved in accordance with the invention by means of the valve arrangement according to the invention as defined in the claims and explained below.

The invention will now be described in more detail with reference to the accompanying, schematic drawing.

DETAILED DESCRIPTION OF THE PREFERRED EMBODIMENTS

Figure 1:
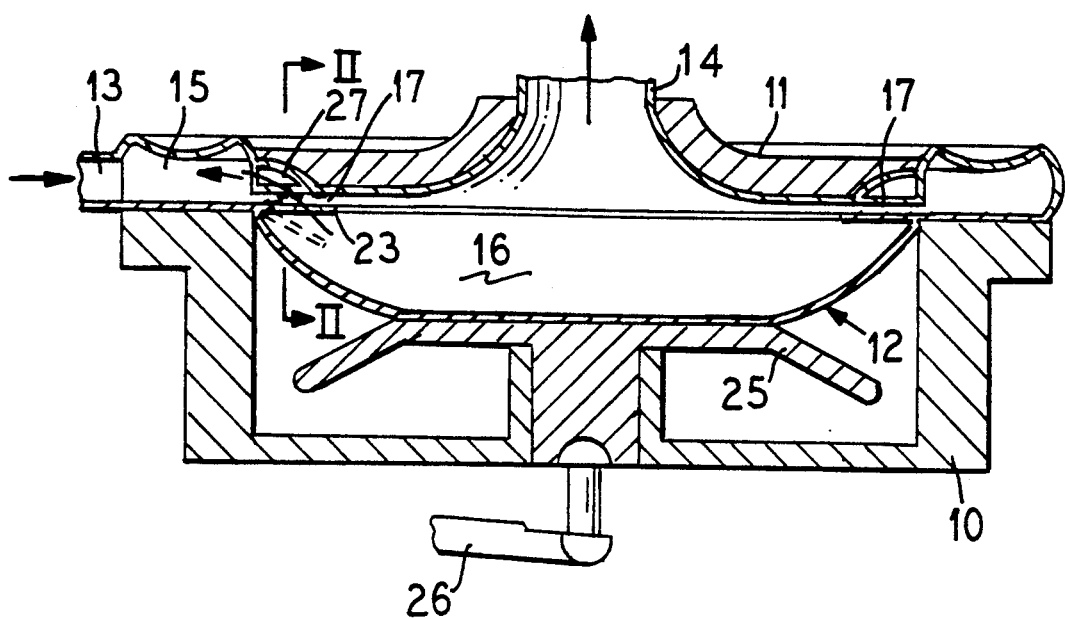
FIG. 1 is an axial sectional view of a piston-type positive-displacement pump provided with an inlet valve embodying the invention.

The pump illustrated schematically in the accompanying drawing is constructed in accordance with the principles set forth in the aforementioned European patent application, the descriptive portion and associated drawings of which are incorporated herein by reference. The illustrated pump will be described here only to the extent necessary for an understanding of the present invention in the light of the contents of the aforesaid European patent application. For a more comprehensive description of the pump, reference is made to the aforesaid European patent application, particularly to the description of the embodiments illustrated in FIGS. 3, 5, 6 and 10.

As illustrated schematically in the accompanying drawing, the pump comprises a housing which includes a rigid base part 10 on which there is mounted a removable upper part 11. The pump housing carries a substantially disc-shaped container element, which is generally referenced 12 and which is shown in the drawing by means of a heavy contour line. At its outer edge the container element 12 has an inlet connection 13, while an upstanding, axial outlet connection 14 is provided in the center of the container element. The container element 12 also includes an annular reservoir or supply chamber 15 into which the inlet connection opens. The container element also includes, radially inwards of the chamber 15, a pump chamber 16 whose peripheral wall communicates with the supply chamber 15 through an inlet passage 17, which has the form of an endless, annular gap that extends between opposite walls of the container element. The pump chamber 16 is in open communication with the outlet connection 14.

The container element 12 may be made of any flexible material which possesses the properties required for the intended use of the pump in each particular case.

The base part 10 of the housing carries different movable parts on which the pump-chamber part of the container element 12 rests and which produce a pumping action by cyclic or repetitive movement. These movable parts include a domeshaped displacement element 25, which can be reciprocated in vertically by means of a lever 26 and a drive means coacting with the lever. When the displacement element 25 moves upwards, the bottom wall of the pump chamber 16 is forcibly or positively displaced to contract or compress the pump chamber 16, thereby to expel fluid contained in the chamber through the outlet connection 14. Conversely, when the displacement element moves downwards, the pump chamber is able to expand while fluid flows from the supply or reservoir chamber 15, through the inlet passage 17 and into the pump chamber 16. In the illustrated embodiment, the container element 12 rests freely on the upper side of the displacement element 25, and consequently the bottom of the pump chamber included in the container element is not forced to accompany the downward movement of the displacement element, although it is within the scope of the invention for the displacement element to forcibly expand the pump chamber, so as to generate a negative pressure therein.

When the pump is running, the supply chamber 15 functions as a reservoir whose volume can vary in accordance with the inflow of fluid through the inlet connection 13 and the outflow of fluid through the inlet passage 17, so that the chamber is able to accommodate the inflowing fluid without any substantial increase in pressure, even during those phases of the pump operating cycle in which it is impossible for fluid to flow into the pump chamber. Mounted in the region of the inlet passage 17 is an inlet valve of the flap valve type. This valve functions to permit fluid to flow from the supply or reservoir chamber 15 into the pump chamber 16 through the inlet passage 17 without any appreciable drop in pressure, and also to prevent fluid from flowing in the opposite direction.

The inlet valve includes a ring-shaped valve flap 23 which extends around the periphery of the pump chamber 16 and is directed towards the center of the pump chamber. Like the remaining part of the container element, the valve flap 23 is made of a flexible material, for example plastic foil or plastic film, and the circular outer edge of the flap is attached to the lower pump-chamber wall at the location where that wall merges with the bottom wall of the supply chamber 15. The flap valve extends freely inwards from its attachment edge and accordingly can move upwards and downwards, as indicated in broken lines in FIG. 1.

More specifically, the valve flap 23 moves downwards to widen the gap between the flap and the upper part 11 of the pump housing, and upwards to a position in which it engages the upper part of the housing over a major part of its length (i.e. its radial dimension). In this latter position, the valve flap 23 will prevent the flow of fluid from the pump chamber 16 to the supply chamber 15.

So far, the illustrated pump essentially resembles some embodiments of the pumps illustrated and described in the aforementioned European patent application. An essential difference between the pump according to the invention and the known pumps, however, is to be found in the region of the inlet valve 17.

Figure 2:
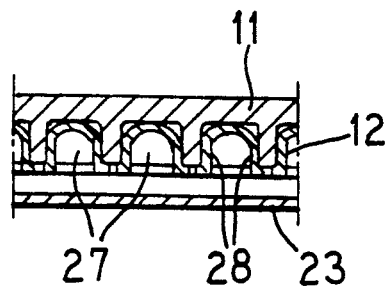
FIG. 2 is a sectional view taken on the line II—II in FIG. 1.

As will be seen from FIG. 1, when viewed together with FIG. 2, the outer edge of the upper housing part of the illustrated pump, namely that part of the upper housing part which lies centrally above the inlet valve flap 23, is provided with a series of recesses 27 which are distributed around the whole of the periphery of the upper housing part and which are open both downwardly towards the valve flap 23 and outwardly towards the supply chamber 15. These recesses are separated from one another by thin flanges or wall parts 28 whose respective bottom edges lie level with the underside of the upper housing part 11 and whose respective outer edges lie level with the circumferential edge of the upper housing part 11. The recesses 27 are preferably formed by milling the discshaped outer portion of the upper housing part 11.

In the region of the recesses 27, the upper wall of the container element 12 is configured so that it will lie in area contact with the sides of the recesses and optionally also the "roof" of the recesses, see FIG. 2.

As will be seen from FIG. 1, the recesses 27 extend inwardly towards the center of the pump chamber 16 over a radial distance such that when the valve flap 23 occupies its closed position, its flap will extend only a short distance beyond the inner end of the recesses.

At that moment of a pump operating cycle at which the pump chamber 16 has been filled and the pressure difference across the inlet passage 17 is thus substantially equalized, the valve flap 23 will be essentially unaffected by fluid forces. It will therefore take an open position, which may be the position illustrated by a full line in FIG. 1, or possibly a position near the position illustrated by a downwardly extending broken line. As soon as the pressure in the pump chamber 16 begins to exceed the pressure in the supply chamber 15—this can occur, for instance, when the displacement element 25 begins to move upwards, or when there is a tendency to backflow of fluid in the outlet connection 14—this pressure difference will act on the underside of the valve flap 23 and tend to move the flap upwards against the upper housing part 11. At this stage, both the gap between the underside of the upper housing part 11 and the valve flap 23, and the recesses 27 and the supply chamber 15 are filled with fluid, and the valve flap 23 must therefore displace the fluid that lies between the underside of the upper housing part 11 and the valve flap. The fluid can be displaced towards the supply chamber 15 very quickly, however, since the volume of fluid to be displaced in this way is relatively small and since a very large cross-section area is open to the necessary fluid flow; this large cross-section area is provided by the recesses 27. Thus, the valve flap 23 is able to move to its closed position very quickly, meaning that the volume of fluid that must be displaced horizontally through the inlet passage 17 is very small.

When, in a following stage of a pump operating cycle, the pressure in the pump chamber 16 falls below the pressure in the supply chamber 15, the pressure difference will again act over the whole surface of the valve flap 23, this time in a downward direction, thereby moving the valve flap rapidly downwards, so as to re-open the flow passage 17. The cross-section flow area available to the fluid flowing from the supply chamber 15 to the pump chamber 16 is still relatively large even at this stage of the pump cycle, due to the presence of the recesses 27.

This provides an essential improvement over a pump which lacks the recesses 27 but which is similar to the described pump in other respects. In the absence of recesses 27, it is necessary for the fluid enclosed between the flap valve 23 and the underside of the upper housing part 11 to flow horizontally out of the gap over a relatively long distance, which means that it will take longer for the flap to move to its closed position. The flow of fluid into the pump chamber 16 during a filling phase will also take longer, since the inlet passage 17 will, in this case, have a considerably smaller cross-section area than in the case of the illustrated embodiment.

The advantages provided by rapid closing of the inlet valve and by a large cross-section flow area of the inlet passage are obtained without the aforementioned outward bulging of the valve flap towards the supply chamber 15 becoming troublesome. This is because the valve flap 23 is supported over the whole of its radial width by the bottom edges of the walls 28 which separate the recesses 27. Naturally, the valve flap has no support between the walls, but the walls can be placed so close together, without undue encroachment on the cross-section flow area, that outward bulging of the flap between adjacent walls will be very slight. Furthermore, the walls may readily be made thin, so as not to severely restrict the cross-section flow area.

As will be understood, it is not necessary to line the recess walls with the material of the container element 12, even though this may be advantageous and practical in many instances.

I claim:

1. A flap valve arrangement for one-way control of the flow of fluid between an upstream chamber and a downstream chamber, forming an inlet valve in a piston-type positive-displacement pump in which the upstream chamber forms an inlet to a pump chamber which forms said downstream chamber and is repetitively pressurisable by means of a driven displacement element, said flap valve arrangement including wall parts, which define between them a fluid-flow passage connecting the chambers, a valve flap having an upstream end and a downstream end, said flap being connected to one of said wall parts at its upstream end and being movable, by the action of fluid forces acting thereon, between a closed position, in which it is in sealing engagement with the other wall part to block the fluid-flow passage, and an open position in which it is spaced from said other wall part to permit fluid to flow through the flow passage, wherein the second wall part presents openings which form a part of the flow passage and which are open both on a side of the wall part that is directed towards the upstream chamber and on a side of the wall part that is directed towards the downstream chamber; and wherein a plurality of valve flap support elements are disposed between the openings on the side of the wall part that is directed towards the downstream chamber.

2. An arrangement according to claim 1, wherein the openings are formed by spaced recesses in the second wall part, the supporting elements being formed by wall-material left between the recesses.

3. An arrangement according to claim 2, wherein the valve flap is made of a highly flexible material.

4. An arrangement according to claim 2, wherein the upstream chamber, the pump chamber and the fluid passage are formed by a container element having the form of a one-piece structure, wherein a wall part of the container element located adjacent the recesses is formed in correspondence with said recesses.

5. An arrangement according to claim 2, wherein the volume of the upstream chamber is variable under substantially constant pressure.

6. An arrangement according to claim 1 or 2, wherein the inlet passage extends over at least a major part of the circumference of the downstream chamber and communicates with the upstream chamber over substantially the whole of its circumferential length.

7. An arrangement according to claim 6, wherein the upstream chamber, the pump chamber and the fluid passage are formed by a container element having the form of a one-piece structure, wherein a wall part of the container element located adjacent the openings is formed in correspondence with said openings.

8. An arrangement according to claim 6, wherein the volume of the upstream chamber is variable under substantially constant pressure.

9. An arrangement according to claim 1, wherein the valve flap is made of a highly flexible material.

10. An arrangement according to claim 9, wherein said highly flexible material comprises plastic film.

11. An arrangement according to claim 9, wherein the upstream chamber, the pump chamber and the fluid passage are formed by a container element having the form of a one-piece structure, wherein a wall part of the container element located adjacent the openings is formed in correspondence with said openings.

12. An arrangement according to claim 1, wherein the volume of the upstream chamber is variable under substantially constant pressure.

13. An arrangement according to claim 12, wherein the upstream chamber, the pump chamber and the fluid passage are formed by a container element having the form of a one-piece structure, wherein a wall part of the container element located adjacent the openings is formed in correspondence with said openings.

14. An arrangement according to claim 1, wherein the upstream chamber, the pump chamber and the fluid passage are formed by a container element having the form of a one-piece structure, wherein a wall part of the container element located adjacent the openings is formed in correspondence with said openings.

15. A flap valve arrangement for a piston-type positive displacement pump, the pump having a downstream pump chamber and an at least partially surrounding upstream inlet chamber, the pump chamber being repetitively pressurisable and depressurisable, comprising:
   a top cover overlying said pump chamber and having a plurality of perimeter spaced apart recesses, each open outwardly into the inlet chamber and downwardly into the pump chamber;
   a perimeter flap extending from an inside wall of the pump chamber inwardly and arranged below said recesses, said flap having a width to cover said recesses when deflected upwardly.

16. The flap valve arrangement according to claim 15, wherein said top cover is spaced above said pump chamber forming an at least partially surrounding flow passage between the inlet chamber, the recesses and the pump chamber.

17. The flap valve arrangement according to claim 15, wherein the pump chamber and the flap are formed of a one piece flexible member.

18. The flap valve arrangement according to claim 17, wherein said inlet chamber comprises a one piece flexible member which extends into the pump chamber overlying said top cover and conforming into said recesses.

19. The flap valve arrangement according to claim 15, wherein said inlet chamber comprises a one piece flexible member which extends into the pump chamber overlying said top cover and conforming into said recesses.

* * * * *